US010162057B2

(12) United States Patent
Metzler et al.

(10) Patent No.: US 10,162,057 B2
(45) Date of Patent: Dec. 25, 2018

(54) PORTABLE DISTANCE MEASURING DEVICE AND METHOD FOR CAPTURING RELATIVE POSITIONS

(71) Applicant: LEICA GEOSYSTEMS AG, Heerbrugg (CH)

(72) Inventors: Bernhard Metzler, Dornbirn (AT); Beat Aebischer, Heerbrugg (CH); Knut Siercks, Mörschwil (CH); Siegfried Wiltsche, Wolfurt (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 15/379,443

(22) Filed: Dec. 14, 2016

(65) Prior Publication Data

US 2017/0168160 A1  Jun. 15, 2017

(30) Foreign Application Priority Data

Dec. 14, 2015 (EP) .................................... 15199932

(51) Int. Cl.
*G01B 11/14* (2006.01)
*G01S 17/42* (2006.01)
(Continued)

(52) U.S. Cl.
CPC ............ *G01S 17/42* (2013.01); *G01C 15/002* (2013.01); *G01S 5/16* (2013.01); *G01S 5/163* (2013.01); *G01S 7/4813* (2013.01); *G01S 17/023* (2013.01)

(58) Field of Classification Search
CPC ........ G01S 7/4813; G01S 17/42; G01S 17/08; G01C 15/002; G01B 11/002; G06T 17/10; H04N 5/225
(Continued)

(56) References Cited

U.S. PATENT DOCUMENTS 5,815,251 A * 9/1998 Ehbets .................... G01C 3/08
356/5.01
2007/0064246 A1 3/2007 Braunecker
(Continued)

FOREIGN PATENT DOCUMENTS

DE   10 2008 054453 A1   6/2010
EP      0 701 702 A1   3/1996
(Continued)

OTHER PUBLICATIONS

European Search Report dated Jun. 23, 2016 in application No. 15199932.3.

*Primary Examiner* — Isiaka Akanbi
(74) *Attorney, Agent, or Firm* — Maschoff Brennan

(57) ABSTRACT

Some embodiments of the invention relate to a method for capturing a relative position of at least one first spatial point by means of a portable distance measuring device, the method comprising positioning a known reference object, which has known features which may be captured by optical means, said features being arranged in a pattern designed for a resection, at least one first measuring process, comprising measuring a first distance to the first spatial point, and recording a first reference image linked in time with measuring the first distance, the reference object being imaged in the first reference image, and ascertaining the position and orientation of the distance measuring device relative to the reference object comprising identifying the reference object, recalling stored information about the known features of the identified reference object and identifying positions of known features of the reference object in the first reference image.

27 Claims, 13 Drawing Sheets

(51) Int. Cl.
    *G01S 7/481* (2006.01)
    *G01C 15/00* (2006.01)
    *G01S 17/02* (2006.01)
    *G01S 5/16* (2006.01)

(58) Field of Classification Search
    USPC ................................................ 356/601–624
    See application file for complete search history.

(56) References Cited

U.S. PATENT DOCUMENTS

| | | | |
|---|---|---|---|
| 2008/0212064 A1* | 9/2008 | Skultety-Betz | G01C 15/002 356/3 |
| 2011/0288818 A1* | 11/2011 | Thierman | G01B 11/00 702/159 |
| 2013/0148098 A1* | 6/2013 | Abraham | G01C 3/08 356/4.01 |
| 2015/0109407 A1 | 4/2015 | Giger | |
| 2015/0204976 A1 | 7/2015 | Bösch | |
| 2015/0309174 A1* | 10/2015 | Giger | G01C 11/02 382/106 |

FOREIGN PATENT DOCUMENTS

| | | |
|---|---|---|
| EP | 0 738 899 A1 | 10/1996 |
| EP | 1 664 674 B1 | 6/2006 |
| EP | 2 669 707 A1 | 12/2013 |
| EP | 2 698 602 A1 | 2/2014 |
| EP | 2698600 A1 | 2/2014 |
| EP | 2 918 972 A2 | 9/2015 |
| WO | 0250564 A2 | 6/2002 |
| WO | 2015/073548 A2 | 5/2015 |

* cited by examiner

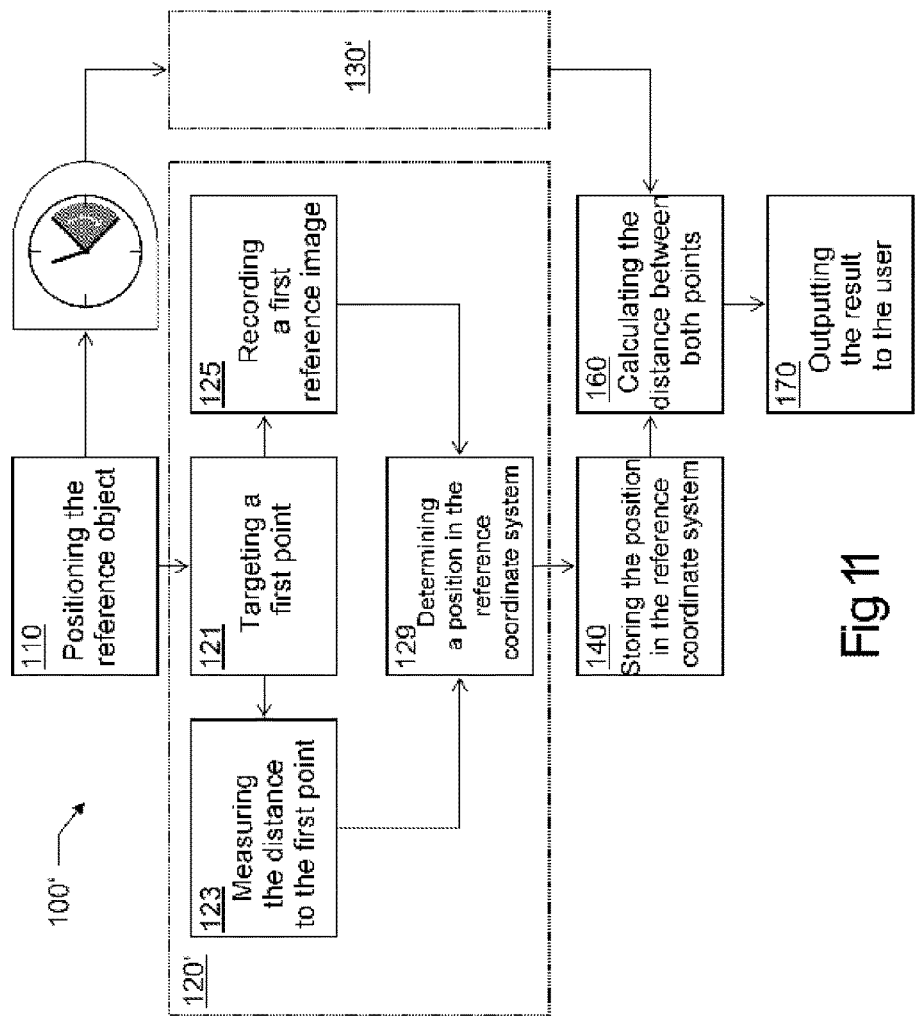

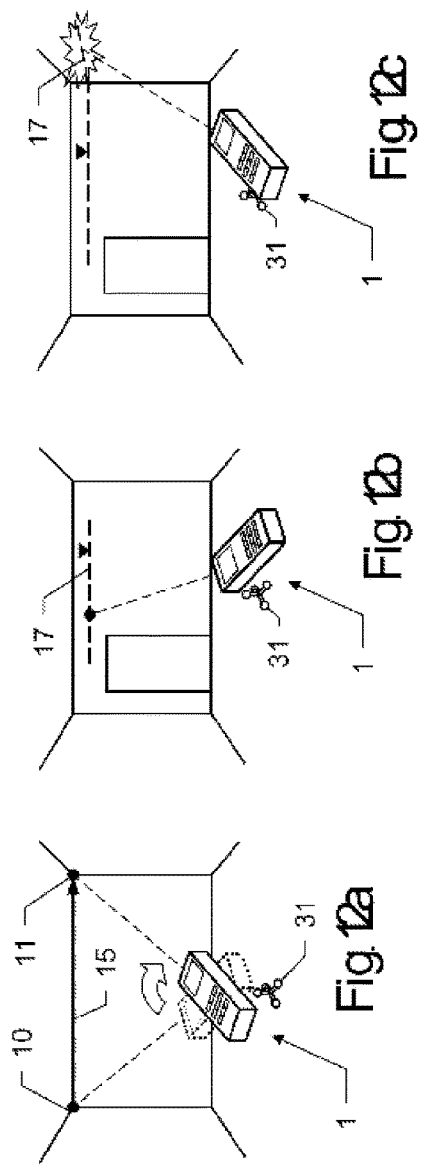
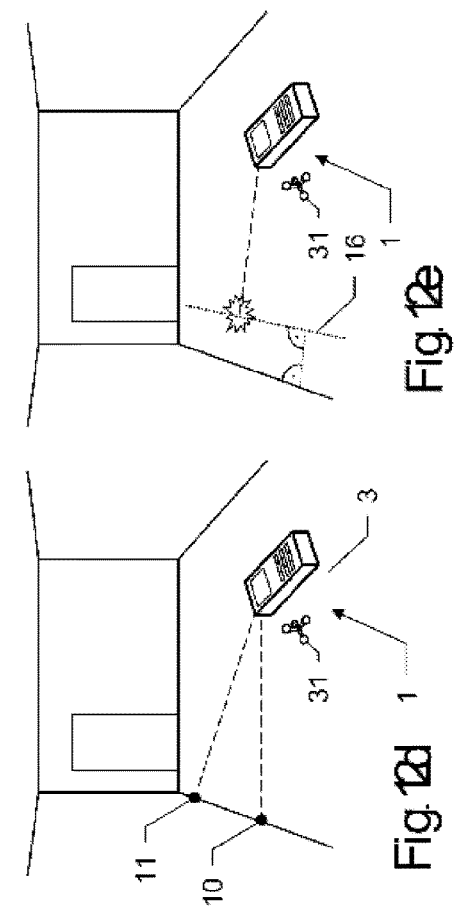

PORTABLE DISTANCE MEASURING DEVICE AND METHOD FOR CAPTURING RELATIVE POSITIONS

FIELD OF THE INVENTION

The present invention relates to a method for capturing relative positions and to a portable distance measuring device for carrying out such a method. In particular, the invention relates to a method for mutual referencing of a plurality of distance measurements carried out by means of a portable distance measuring device. To this end, a portable distance measuring device according to the invention contains an optical pose determination unit for capturing a pose of the distance measuring device relative to a reference object. In particular, this reference object defines the origin of a local reference coordinate system and facilitates the determination of solid angles in relation to the reference coordinate system, as a result of which, together with the distance measurements, relative three-dimensional coordinates of spatial points may be determined and displayed to a user.

BACKGROUND

Methods and systems for measuring distance are used in many applications. Examples for this include very precise measurements in geodesic applications, but also measurement problems in the field of building installation or for industrial process controls. In these problems, use is made of stationary, movable or else portable distance measuring devices which carry out an optical distance measurement to a selected measurement point. Here, a laser beam is usually emitted and received again, and evaluated, after reflection at the target. Here, different measurement principles are available for determining the distance, for example a phase measurement or a time-of-flight measurement.

Particularly in the field of building installation or building inspection, use is made of portable and handheld devices which are placed in relation to a structure to be measured and then carry out a distance measurement to a surface. Portable distance measuring devices which are suitable and typical for such applications are described in e.g. EP 0 738 899 and EP 0 701 702. Since a measurement point visible on the surface to be measured is advantageous for most applications, red lasers are usually used as radiation sources for distance measurements. In conjunction with great ease of handling, accuracies down to the millimeters range can be achieved with rangefinders in the prior art. Using conventional portable distance measuring devices, it is possible to carry out measurements from one point to another point to which there is a sight connection. If the target is concealed, many devices may also ascertain horizontal mass by means of an inclination sensor.

One possibility for determining a distance between two points, which can also be used if there is no line of sight between the points, is calculation by means of trigonometry. This is already known sufficiently from ground-based surveying devices, such as theodolites or total stations. For trigonometrically ascertaining a distance a between two spatial points B and C, it suffices to know the distance to these two points from a third point A, and the angle α at point A between the sides b and c in the direction of the points B and C. The length of a can then be calculated by means of the cosine law:

$$a = \sqrt{b^2 + c^2 - 2 \cdot b \cdot c \cdot \cos \alpha}$$

Although a conventional handheld distance measuring device from the prior art makes it possible to measure the distances b and c to the spatial points B and C exactly, a function for accurately and reliably determining the angle α is usually missing. Currently available acceleration sensors cannot yield a sufficiently reliable value for α for distance calculation purposes, and compasses are susceptible to disturbance particularly in interiors of buildings; at best angles in the vertical can be ascertained with sufficient accuracy and reliability by means of inclination sensors.

The prior art describes various solutions with portable distance measuring devices comprising laser rangefinders by means of which two points can be targeted simultaneously or sequentially, wherein an angle between the emission directions of the two lasers can be determined.

EP 2 698 602 A1 discloses such a distance measuring device with a referencing unit that may be folded out, the latter being brought into contact with a surface, wherein a solid angle between a first alignment and a second alignment of the device relative to the surface may be determined by means of rotary encoders. On the one hand, this approach is structurally complex and, on the other hand, requires the presence of a suitable surface.

Document EP 1 664 674 B1 relates to a method and a system for determining the actual position of a portable measuring device in space. To this end, the measuring device additionally comprises an active scanning functionality for scanning the space by means of a laser beam and for capturing a plurality of reflectors distributed in the space. This solution is also structurally complex.

Furthermore, it requires a relatively time-consuming distribution and attachment of a multiplicity of reflectors in space and the recollection thereof after completing the measurements.

Camera-based optical methods require less structural outlay. Such methods known from the prior art use either image stitching or SLAM (simultaneous localization and mapping) for ascertaining the change in pose. Thus, disclosed in the application EP 2 669 707 A1 discloses a portable distance measuring device for carrying out a method for indirectly determining distances by means of two directly measured distances and an angle, the angle being ascertained from a panoramic image which was generated by means of image stitching from images recorded in the direction of the distance measurement by a camera of the distance measuring device. By contrast, in the method described in WO 2015/073548 A2, an object of known dimensions is recorded in a first image in order to obtain a scale for the recorded image. A change in the pose of the device is then ascertained by means of SLAM. However, on the one hand, these methods place certain requirements on the recorded surface, which must have a sufficient number of features which may be uniquely captured by optical means, for image stitching or SLAM. In particular, these methods cannot be sensibly employed in the case of measurements on unstructured (e.g. uniformly white) walls. On the other hand, a significant computational outlay also arises disadvantageously.

SUMMARY

Some embodiments of the present invention provide an improved portable distance measuring device and an improved distance measuring method, which permit determination of relative three-dimensional coordinates of spatial points.

Some embodiments of the present invention provide such a distance measuring device and a method which permit a determination of relative three-dimensional coordinates of at least two spatial points within a common reference coordinate system.

Some embodiments of the invention provide such a distance measuring device with less structural outlay and such a method with less computational outlay.

Some embodiments of the invention provide such a distance measuring device and such a distance measuring method which facilitate a coordinates determination independently of the nature of the surface to be measured. P A portable distance measuring device according to the invention contains a distance measuring module for measuring the distance to spatial points situated on surfaces. The distance measuring module is preferably a laser rangefinder which emits a laser beam, in particular a visible laser beam, in the direction of a point to be measured. To this end, the distance measuring module has an optical unit, for example inserted into the housing of the distance measuring device. For the purposes of optically measuring the distance to a surface, optical transmission rays which are modulated by the optical unit and in the form of a beam are emitted toward the surface by the device. Some of the rays of the transmission rays reflected at the surface are collected again by the optical unit and evaluated electronically for determining distances.

Such a portable distance measuring device according to the invention moreover preferably contains an inclination sensor for ascertaining at least one longitudinal inclination of the device. Determination of the pose of the portable distance measuring device in the space may be ascertained fully automatically in relation to the reference coordinate system by means of the inclination sensor.

By integrating additional components for capturing the relative spatial pose, the distance measuring device according to the invention is able to measure horizontal and vertical solid angles, a transverse inclination of the laser rangefinder or the horizontal axis of the distance measuring device, a longitudinal inclination of the laser rangefinder and a longitudinal inclination of the horizontal axis in addition to distances. Corrected three-dimensional coordinates may be ascertained by an evaluation unit using these measured values, with it being possible for said coordinates to be used, inter alia, to calculate horizontal and oblique distances between spatial points. According to the invention, these additional components of the pose determination unit suitable for determining the pose comprise an image recording unit for recording reference images of a known reference object, in particular at the same time as the distance measurement. Optionally, a two-axis inclination sensor on the horizontal axis, a compass and/or an acceleration sensor may additionally be contained. Optionally, a first alignment of the system may be carried out on the basis of a compass or GPS sensor.

A first aspect of the present invention relates to a method for capturing a relative position of at least one first spatial point by means of a portable distance measuring device. According to the invention, the method comprises positioning a known reference object, which has known features which may be captured by optical means, said features being arranged in a pattern designed for a resection, and at least one first measuring process, comprising measuring a first distance to the first spatial point and recording a first reference image linked in time with, in particular at the same time as, measuring the first distance, the reference object being completely or at least partly imaged in the first reference image. Moreover, the method comprises ascertaining the position and orientation of the distance measuring device relative to the reference object comprising identifying the reference object, recalling stored information about known features of the identified reference object and identifying positions of known features of the reference object in the first reference image.

In accordance with a special embodiment, the method according to the invention comprises at least one first and one second measuring process, wherein ascertaining of the position and orientation of the distance measuring device relative to the reference object comprises ascertaining a pose change of the distance measuring device between the first measuring process and the second measuring process. The second measuring process comprises measuring a second distance to the second spatial point and recording a second reference image linked in time with, in particular at the same time as, measuring the second distance, the reference object being imaged in the second reference image. Here, ascertaining of the pose change comprises identifying the reference object, recalling stored information about known features of the identified reference object and identifying positions of known features of the reference object in the first reference image and in the second reference image.

In one embodiment of this method, the first reference image and the second reference image are recorded using an image sensor, in particular a digital camera, of the distance measuring device, and ascertaining the change in pose includes capturing a first spatial pose and a second spatial pose of the distance measuring device, in particular in a local three-dimensional coordinate system.

In a special embodiment, the known features are imaged on an image plane of the image sensor in the first reference image and the second reference image, capturing of the first spatial pose is carried out on the basis of the positions of the known features of the first reference image on the image plane and capturing of the second spatial pose is carried out on the basis of the positions of the known features of the second reference image on the image plane.

In one embodiment of the method according to the invention, the first measuring process comprises aligning the distance measuring device onto a first spatial point in a first emission direction, and measuring of the first distance to the first spatial point is carried out in the first emission direction. Here, in particular, a second measuring process comprises aligning the distance measuring device onto a second spatial point, and measuring of a second distance to the second spatial point is carried out in the second emission direction.

In a further embodiment of the method according to the invention, the known features have patterns configured as QR codes, Aztec codes or ArUco codes and/or which are arranged on a two-dimensional surface of a flat reference object.

In accordance with another embodiment of the method according to the invention, the known features are arranged as a multiplicity of differently formed and/or patterned surfaces of a three-dimensional reference object.

In an embodiment with a three-dimensional reference object, the latter is substantially cubical, tetrahedral, tetrapodic or pyramidal and/or comprises a multiplicity of substantially spherical reference bodies.

In a further embodiment with a three-dimensional reference object, the latter is aligned in the direction of gravitational acceleration, for example by freely hanging the reference object on a mount. In particular, the mount may be fastened in the space, for example on a surface of the space, and in particular by means of an adhesive surface, a suction pad, a magnet and/or a screw thread of the mount.

In accordance with one embodiment, the method according to the invention comprises fastening the reference object in the space, in particular on a surface of the space, and for example by means of an adhesive surface, a suction pad, a magnet and/or a screw thread of the reference object.

In accordance with another embodiment, the method according to the invention comprises positioning the reference object with a known spatial relationship to a spatial point—particularly wherein the reference object has a labeled placement point for placement on this spatial point—, and ascertaining the position and orientation of the distance measuring device relative to the spatial point.

In accordance with a further embodiment of the method according to the invention, feature data, comprising information about known features of at least one known reference object, in particular of a multiplicity of reference objects, are stored in a memory unit of the distance measuring device and provided for identifying the reference object.

In one embodiment, the feature data are provided to an external device, e.g. a printer or 3D printer, and a reference object is produced by the external device, in particular a flat reference object by printing a pattern onto film or paper or a three-dimensional reference object by means of manufacturing methods which build up or ablate materials.

A second aspect of the present invention relates to a portable distance measuring device for ascertaining relative coordinates of spatial points. The distance measuring device comprises a distance measuring unit, in particular a laser rangefinder, for measuring distances to spatial points along an emission direction in a space, an evaluation component configured to derive and provide the measured distances and a pose determination unit for ascertaining a relative spatial pose of the distance measuring device. According to this aspect of the invention, the distance measuring device comprises a memory unit for storing feature data and for providing the feature data to the pose determination unit, the feature data comprising information about known features, which may be captured by optical means, of one or more known reference objects, and the pose determination unit comprises at least one image sensor configured to record reference images linked in time with, in particular at the same time as, measuring of a distance by the distance measuring unit, and an image evaluation component configured to identify a known reference object, imaged in the reference images recorded by the at least one image sensor, on the basis of the provided feature data and ascertain a pose of the distance measuring device on the basis of the distribution of the features in at least one reference image.

In one embodiment of the distance measuring device in accordance with the second aspect of the invention, the image evaluation component is configured to ascertain a change in pose of the distance measuring device on the basis of the distribution of the features in at least two reference images and the evaluation component is configured to link the ascertained change in pose with at least two measured distances.

Here, in particular, the evaluation component is configured to derive and provide the ascertained change in pose, calculate and provide a distance, in particular an oblique distance and/or a height difference, between two measured spatial points and/or calculate and provide positions in a three-dimensional local coordinate system.

A third aspect of the present invention relates to a further portable distance measuring device comprising a distance measuring unit, in particular a laser rangefinder, for measuring distances to spatial points along an emission direction in a space, an evaluation component configured to derive and provide the measured distances, a holding point for holding the distance measuring device on a surface point on a surface of the space, and a pose determination unit for ascertaining a spatial pose of the distance measuring device. According to this aspect of the invention, the distance measuring device comprises a memory unit for storing feature data and for providing the feature data to the pose determination unit, the feature data comprising information about known features, which may be captured by optical means, of one or more known reference objects, and the pose determination unit comprises at least one image sensor configured to record at least one reference image linked in time with, in particular at the same time as, holding the distance measuring device at a surface point, and an image evaluation component configured to identify features in the at least one reference image and ascertain a relative position of the surface point on the basis of the distribution of the features in at least one reference image.

In one embodiment of the distance measuring device in accordance with the second or third aspect of the invention, the image sensor and the distance measuring unit are arranged on the distance measuring device in such a way that the emission direction of the distance measuring unit lies outside of a capture zone of the image sensor. In particular, they are arranged in such a way that the emission direction and a recording direction of the image sensor are substantially orthogonal, for example arranged at an angle of 75° to 100° in relation to one another.

In accordance with another embodiment of the distance measuring device, the image sensor and the distance measuring unit are arranged on the distance measuring device in such a way that the emission direction of the distance measuring unit lies within a capture zone of the image sensor and provision is made of deflection means which, in particular, comprise at least one mirror and which are configured to deflect a recording direction of the image sensor, in particular in such a way that the emission direction and a recording direction of the image sensor are substantially orthogonal, for example arranged at an angle of 75° to 100° in relation to one another.

In accordance with a further embodiment, the distance measuring device comprises a display unit for displaying measured and calculated distances and/or coordinates of spatial points, and input means for selecting functions of the distance measuring device. Here, in particular, the display unit and the input means are arranged on a first side, in particular an upper side, of the distance measuring device and the image sensor is arranged on a second side, in particular a lower side, of the distance measuring device lying opposite to the first side.

In a further embodiment, the distance measuring device additionally comprises an overview camera for recording images in the direction of the emission direction and the display unit is additionally configured to display images recorded by means of the overview camera.

In accordance with another embodiment, the distance measuring device in accordance with the second or third aspect of the invention comprises a memory unit for storing feature data and for providing the feature data to the pose determination unit, the feature data comprising information about known features, which may be captured by optical means, of one or more known reference objects, and the image evaluation component is configured to identify an imaged known reference object in the at least one reference image on the basis of the provided feature data. In particular, the image evaluation component is configured to ascertain a pose of the distance measuring device on the basis of the distribution of the features in the at least one reference image.

A fourth aspect of the present invention relates to a system comprising a portable distance measuring device in accordance with the second or third aspect of the invention and a reference object, wherein the reference object has known features which may be captured by the image sensor, said features being arranged in a pattern optimized for a resection, and the known features of the reference object are provided in a memory unit of the distance measuring device.

Here, in one embodiment of the system according to the invention, the distance measuring device and the reference object are configured in such a way that they may assembled to form a unit suitable for transport and storage, particularly wherein the distance measuring device has a receptacle for the reference object or the reference object is configured as a sleeve of the distance measuring device.

A further aspect of the present invention relates to a computer program product comprising program code stored on a machine-readable medium, for running the following steps of the method according to the invention, in particular if the program is run on an electronic data processing unit embodied as an evaluation component of the distance measuring device according to the invention: measuring the first distance, recording the first reference image substantially at the same time as measuring the first distance, identifying the reference object, recalling stored information about the known features of the identified reference object and identifying positions of known features of the reference object in the first reference image.

BRIEF DESCRIPTION OF THE DRAWINGS

The portable distance measuring device according to the invention and the measuring method according to the invention are described in more detail below in a purely exemplary manner on the basis of specific exemplary embodiments schematically depicted in the drawings, with further advantages of the invention also being discussed. In detail:

FIG. 8b shows a measuring process using a portable distance measuring device according to the invention and the reference object from FIG. 8a;

FIG. 11 shows a second exemplary embodiment of a method according to the invention;

FIGS. 12a-e show various exemplary applications of a distance measuring device according to the invention;

DETAILED DESCRIPTION

Figure 1A:
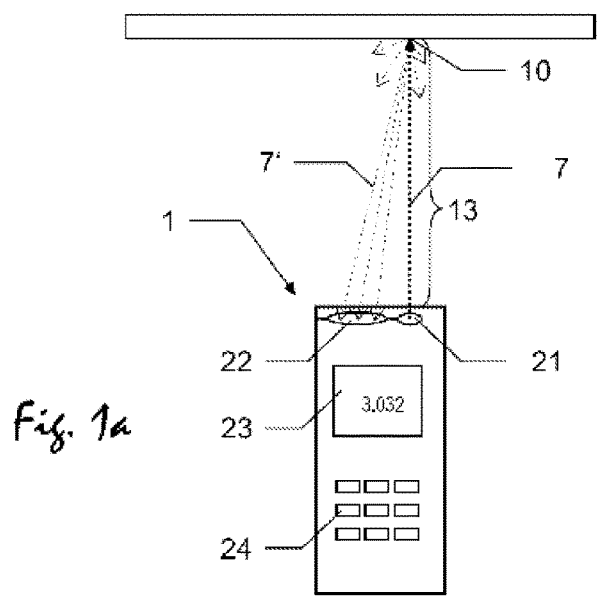
FIGS. 1a-b show a generic portable distance measuring device comprising a laser rangefinder.
Figure 1B:
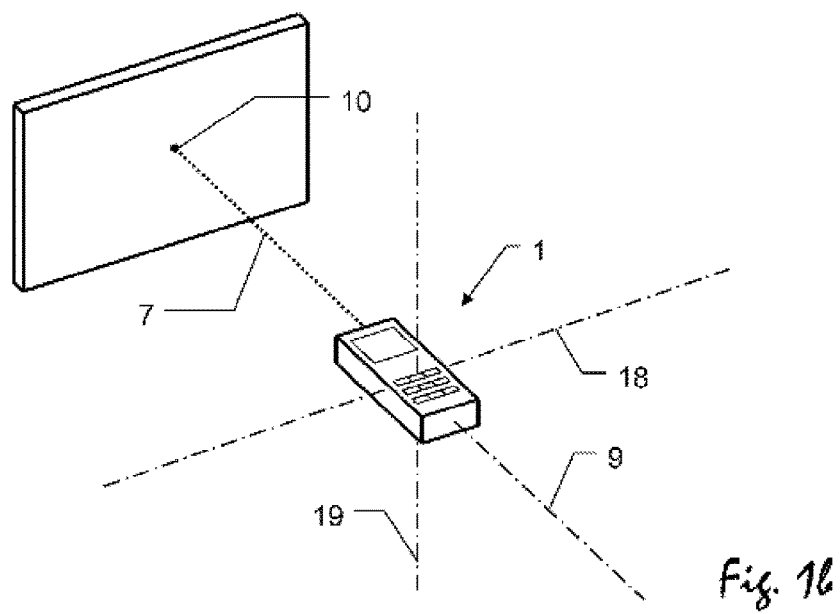

FIGS. 1a and 1b depict, in an outside view, a portable distance measuring device 1 in question for measuring distances. It comprises a housing in which the necessary electronic components are arranged. In this case, the housing is embodied in such a way that the distance measuring device 1 may be handheld and may also, in a defined manner, be placed on, or attached to, a point to be measured. To this end, appropriate placement edges or fastening elements which may be folded out or plugged on, as described in e.g. WO 02/50564, may be attached to the housing. On the front side thereof, the distance measuring device 1 contains a laser rangefinder 20 with a laser emission unit 21 and a laser reception unit 22, which comprise optical openings in the housing. An indication device 23 in the form of a display and input means 24 in the form of a keypad are situated on the upper side of the device. Moreover, provision may be made of a camera—not depicted here—for recording images in the direction of the emission direction.

As depicted in FIG. 1a, the laser emission unit 21, according to the invention, transmits a laser beam 7 to a measurement point 10 on a wall. The wall has a naturally rough surface, from which optical rays are reflected in a scattered manner. Some of the rays 7' reflected in a scattered manner are collected by the laser reception unit 22, detected and converted into an electrical signal. The signal is evaluated in a manner known per se by an electronic circuit in order to determine the digital value of the distance 13. By way of example, a phase measurement or a time-of-flight measurement may be used to ascertain the distance. Here, the extent between the laser reception unit 22 and a measurement stop is also taken into account. The value of the measured distance 13—e.g. 3.032 meters in this case—which is determined digitally by the evaluation is then made available on the display 23 to a user.

FIG. 1b shows the portable distance measuring device 1 according to the invention which emits a laser beam 7 in the emission direction 9 to measurement point 10. The illustration also shows the axes of rotation extending orthogonal to the emission direction 9: the transverse axis 18 and the vertical axis 19.

Figure 2:
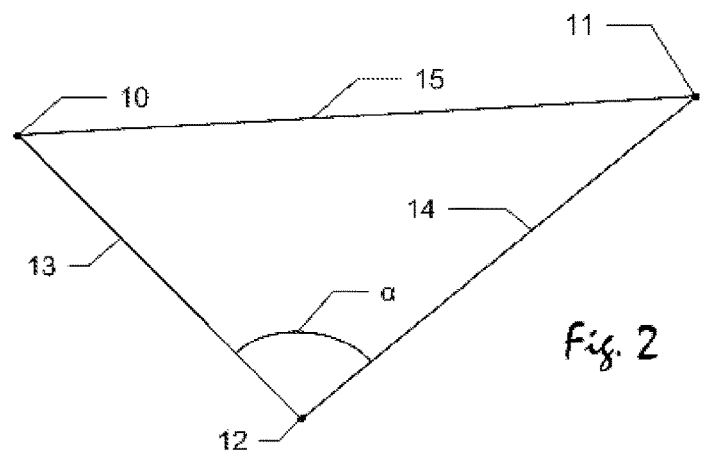
FIG. 2 shows how distance is ascertained indirectly by means of the cosine law.

FIG. 2 shows the trigonometrical principles of the method according to the invention. The length of a section 15 can be calculated by means of the known distances 13, 14 from an arbitrary spatial point 12 to the end points 10, 11 of the section 15 and the angle α between the directions from the spatial point 12 to the end points 10, 11. The cosine law, in particular, can be used for this purpose. According to the invention, the angle is ascertained by means of an optical pose determination unit which also captures a spatial offset of the spatial point 12 between the first measurement and the second measurement (not depicted here).

Figure 3:
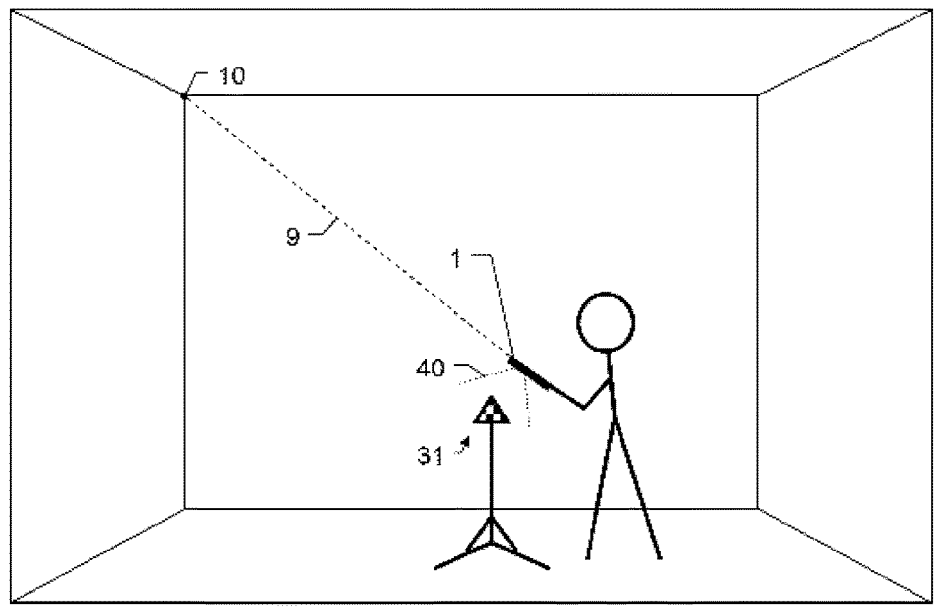
FIG. 3 shows measuring of a distance and simultaneously capturing a spatial pose of the distance measuring device.

FIG. 3 schematically depicts a first method step of an exemplary embodiment of the method according to the invention. Using the portable distance measuring device 1, a user targets a point 10 to be measured—in this case a corner of a space—in such a way that the emission direction 9 of the measurement beam is directed to the point. The distance measuring device 1 comprises a camera (not depicted here) which has a capture zone 40 for recording images. A reference object 31 (depicted here on a tripod) with features which may be captured by optical means and which are arranged with a known pattern is situated in this capture zone 40. While the user triggers the measurement to the point 10, the camera records—in particular in a fully automatic manner—a reference image of the known reference object 31 situated in the capture zone 40 at the same time or substantially at the same time. By image evaluation and resection, the patterns of the reference object 31 permit the relative position of the camera to be ascertained and hence the relative position of the distance measuring device 1 to be ascertained in relation to the reference object 31 in six degrees of freedom (6 DOF). If the position of the reference object 31 remains unchanged, a multiplicity of measurements may be carried out within the same local coordinate system.

The reference object 31 may be referenced in the space prior to the measurements. In particular, this may be carried out by measuring the distances to three corners in the space—the coordinates of which may moreover be known in a superordinate reference coordinate system—while at the same time capturing the reference object 31 in each case. It is also possible to calibrate a plurality of mutually distinguishable targets in a common reference coordinate system by calibrating three common target points in each case. By means of this procedure, it is possible, for example, to relate the coordinates of measurement points in different spaces to one another.

The reference object 31 has a set of identifiable feature points with a known geometric configuration. It may have a three-dimensional structure, e.g. a tetrahedron with a known edge length, or else it may be planar, e.g. a measurement mark of known dimensions. The feature points need to be identifiable: in the case of a tetrahedron, the feature points may, for example, be color-coded vertices; in the case of a planar reference object, the feature points may e.g. be similar to a barcode. The feature points may also be actively produced, e.g. by modulated infrared LEDs.

If the reference object has luminous feature points, these may either shine continuously or else in cooperation with the image recording; to this end, the reference object may be connected to the distance measuring device, for example by way of a Bluetooth connection. Hence, the feature points may always light up simultaneously with the distance measurement while recording a reference image.

Advantageously, images may be recorded continuously by the camera(s) of the distance measuring device 1 and the feature points may always shine when the reference object was identified in the capture zone 40.

Alternatively, the feature points may be configured as reflectors and the distance measuring device 1 has an illumination unit which emits flash-reflections in the direction of the capture zone 40.

The set of identifiable feature points may be complemented by local features, i.e. "natural" features present in the surroundings, which may be detected and matched by means of, for example, SIFT (scale invariant feature transform). These local features may be used for subsequent point measurements and may improve the accuracy and robustness of ascertaining the pose.

Alternatively, the reference object 31 may have a form which is rotationally symmetric along at least one axis (cylinder or sphere) and a known, directionally dependent code pattern, e.g. a pseudo-random code. By means of such a reference object, it is easy to directly derive angle information along one or two axes from a single image of the reference object, independently of the orientation of the camera relative to the reference object. This information may be used to improve the robustness and accuracy when determining the camera orientation. Such an arrangement is expedient, in particular, if the line of sight of the laser and the field-of-view of the camera are aligned parallel or almost parallel to one another, as is often the case with portable distance measuring devices having a viewfinder or an overview camera. If a cylindrical reference object is positioned at the height of one meter in the center of a space, for example on a tripod, the user can target practically every point in the space without losing the reference object from the field-of-view of the camera in the process, by virtue of moving around the reference object.

If the camera (or one of many cameras) is aligned in the direction of the line of sight of the laser, a distance to the reference target may initially be measured in an optional first step for the purposes of increasing the accuracy.

Figure 4:
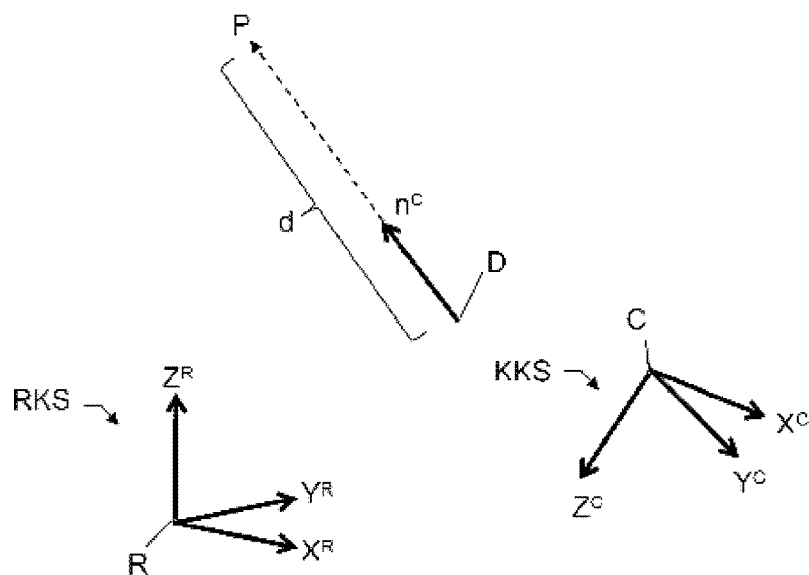
FIG. 4 shows a camera coordinate system and a reference coordinate system.

FIG. 4 illustrates a possible coordinate transformation in an exemplary manner. The coordinates $P^C$ in the coordinate system of the camera unit (camera coordinate system, KKS) of the point P may be calculated using the formula $$P^C = D^C + dn^C,$$

where $D^C$ is an origin of the distance measuring device in the KKS, $n^C$ is the measurement direction in the KKS, and d is the measured distance to the point P.

The vector $D^C$ and the unit vector $n^C$ are parameters which need to be calibrated. This is described further below.

The transformation of the coordinates of the point P from the KKS to the reference coordinate system (RKS) may be described by means of the equation $$P^R = R^{CR} P^C + C^R,$$

where $R^{CR}$ is the rotation matrix which rotates from the KKR to the RKR and $C^R$ is the origin of the KKR, specified in the RKR. $C^R$ and $R^{CR}$ define the position and orientation of the camera unit in relation to the reference object. These values may be calculated as described with reference to FIGS. 5a and 5b.

Although, in principle, the RKS need not be made horizontal, i.e. aligned referenced to the direction of gravitational acceleration, gravitational acceleration information simplifies processing of the measurement results. To this end, the reference object itself may provide information about the direction of gravitational acceleration, e.g. by means of an optically captureable leveling device or by suspending the reference object. Alternatively, or additionally, the direction of gravitational acceleration may also be captured and provided by an inertial sensor of the distance measuring device.

By way of example, for the purposes of calibrating the vector $D^C$ and the unit vector $n^C$ distance measurements to a natural or artificial structure may be carried out while the camera observes the reference object. The measured distances and the recorded images are then used to estimate the calibration parameters. A simple option lies in using a flat wall as a structure which geometrically defines a vertical plane. Such walls are usually available in inner spaces. If $n^R$ is that unit normal vector of this plane in the RKS and if t is its distance from the origin of the RKS, then the scalar condition emerging from a measurement point $P^R$ lying on the wall is $$(n^R)^T P^R = t,$$

where $(n^R)^T$ denotes a transpose of $n^R$ and $P^R$ may be calculated by the equation $$P^R = R^{CR}(D^C + dn^C) + C^R.$$

Figure 5A:
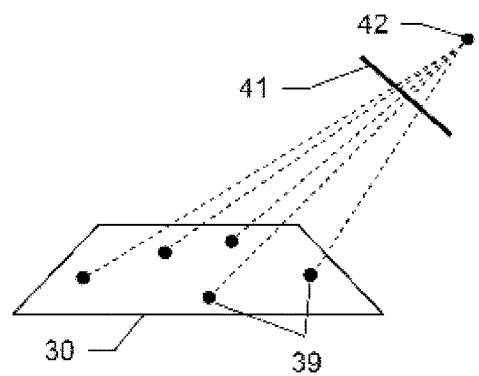
FIGS. 5a-b show localizing a camera unit on the basis of a distribution of image points of a known pattern on a sensor plane.
Figure 5B:
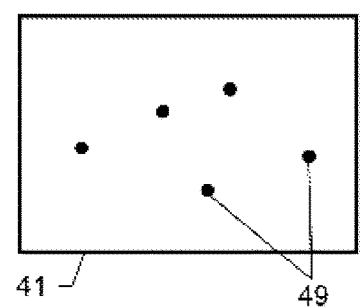

FIGS. 5a and 5b show recording of the features 39 by the camera unit and the projection 49 thereof onto an image plane 41.

The position $C^R$ and the orientation $R^{CR}$ of the camera unit relative to the RKS is derived by means of an image of the reference object 30. To this end, a number of feature points 39 must be imaged in the image of the reference object, the coordinates of which feature points in the RKS are preferably known.

The position and orientation of the camera may be ascertained with the aid of the collinearity equations which express the measured coordinates 49 in the image plane 41 as a function of position and orientation. Position and orientation have six parameters, which define the six degrees of freedom of the camera. Each measured coordinate 49 yields two equations. Overall, at least three feature points are required to solve these equations for the six parameters. This is known as resection. The method may vary depending on the knowledge of the geometric configuration of the reference object.

Figure 6:
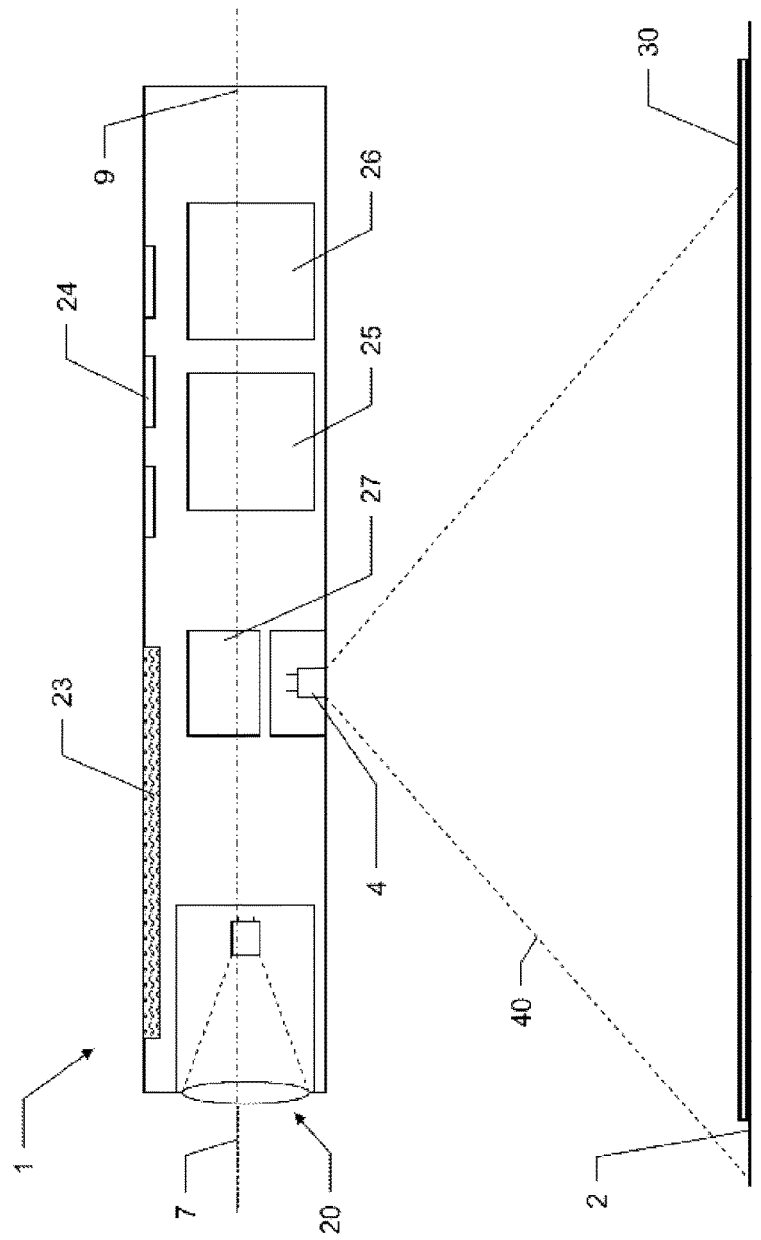
FIG. 6 shows a cross section of a portable distance measuring device according to the invention.

FIG. 6 illustrates a longitudinal section through an exemplary embodiment of the portable distance measuring device 1 according to the invention.

The distance measuring device 1 contains a laser rangefinder 20 which is configured to emit a laser beam 7 in the emission direction 9. Moreover, a display 23 and input means 24 are illustrated. An evaluation component 25 and memory unit 26 are shown as internal components.

Moreover, an energy source (not depicted) is contained in the distance measuring device 1, in particular a battery or accumulator which provides electrical energy for the electrically operated components of the distance measuring device 1. Optionally, the distance measuring device 1 may comprise further components, for example an inclination sensor, in particular a two-axis inclination sensor on the horizontal axis, a compass, a GPS sensor, an acceleration sensor, in particular a three-axis acceleration sensor, or a gyroscope. The acceleration sensors or gyroscopes may be installed in the form of an IMU (inertial measurement unit) which, in particular, is based on MEMS technology. A first alignment of the system may optionally be carried out on the basis of the compass or the GPS sensor.

A distance value available digitally may—as is conventional these days in the case of optically measured distances—be stored by the evaluation component 25 of the device, processed further or transferred and displayed to a user on the display 24.

According to the invention, the depicted distance measuring device 1 comprises a pose determination unit. The latter comprises, firstly, an image capture unit comprising at least one image sensor 4, in particular a digital camera, the image sensor 4 being configured to record images of a capture zone 40. Secondly, the pose determination unit comprises an image evaluation component 27 for evaluating the recorded images.

The portable distance measuring device 1 depicted here is positioned in such a way that the capture zone 40 of the image capture unit is partly aligned onto a reference object 30 situated on a surface 2 in a space. Here, the reference object 30 is depicted as a flat patterned object, for example a printed film or a printed sheet of paper. The pattern is known and stored in the memory unit 26 of the distance measuring device 1. The image evaluation component evaluates the image with the partly imaged reference object 30 (reference image), recalls the data stored in the memory unit 26 and identifies the known reference object 30 on the basis of the pattern. The pattern, which is preferably optimized for a resection, allows the image evaluation component 27 to ascertain a relative pose of the distance measuring device 1 at the instant when the image was recorded. By simultaneously measuring the distance to a targeted point by means of the laser rangefinder 20, it is thus possible to determine the relative position of this point from the reference object 30. As a result, the point may be described using coordinates in a local reference coordinate system.

Here, the image sensor 4 is arranged on the lower side of the device and orthogonal to the emission axis 9. However, other advantageous arrangements are also possible; for example, the camera may, in particular, be aligned slightly to the front, e.g. at an angle between 60° and 90° in relation to the emission direction of the laser beam 7, or directed slightly to the back, e.g. at an angle of between 90° and 100° with respect to the emission direction.

Advantageously, the capture zone 40 is configured to be as large as possible in order to ensure the reference object 30 is captured in as many different poses of the distance measuring device as possible. In addition to wide-angle cameras, fisheye cameras may also be considered, as well as solutions with a plurality of cameras, in particular differently aligned cameras, as depicted in FIGS. 13a-d. Alternatively, e.g., one camera may be arranged in the emission direction and three further cameras may be aligned orthogonal to the emission axis—one aligned downward and in each case one to the left and to the right, laterally on the device—in order to be able to capture a region of the space which is as large as possible.

Optionally, the image capture unit (with the image sensor 4) may also have a movable design; in particular, it may be adjustable by the user by hand or else controlled in a motor-driven manner, for example in order to keep the reference object 30 in the capture zone 40. The respectively current alignment relative to the distance measuring device 1 may then, for example, be determined by means of an angle encoder. Alternatively, the alignment may be determined by calibration.

Likewise, provision may optionally be made of deflection means which are able to deflect the capture zone 40 of a fixedly installed image capture unit; by way of example, they may deflect a forwardly directed capture zone 40 downward by 90°. To this end, the deflection means may, in particular, comprise one or more mirrors.

As presented, for example, in EP 2 698 600 A1, the distance measuring device 1 may also have a modular design. Thus, for example, a distance measuring module may be connected to a smartphone, with a camera of the smartphone providing the image sensor.

Advantageously, the image capture unit may have marking means which optically mark the capture zone 40, for example by means of a projection of light points, in order to indicate to the user whether the reference object 30 is situated in the capture zone.

By way of example, the reference object 30 may be a pane which may be inserted into a corresponding opening of the distance measuring device 1 for transportation purposes. The reference object 30 may also be configured as a sticker for single or multiple use.

The reference object 30 has a pattern which is suitable for resection. By way of example, the code may be based on ArUco marks, QR or Aztec codes, or comprise these. Additionally, further information readable by the image evaluation component 27 may be encoded into the pattern, for example in order to be able to uniquely identify the reference object 30. It is also possible to provide, for example in the form of a QR code, a web link for downloading the pattern of the reference object 30.

Alternatively, the reference object may also be present in a non-physical manner, e.g. as a known pattern projected onto a surface by means of a projector.

The patterns of the reference object 30 are stored in the memory unit 26. In the case of a flat reference object 30, the distance measuring device 1 may have a data interface (Bluetooth, USB, etc.) for connection to a printer in order to produce a reference object 30 by printing the stored pattern onto paper or film. Alternatively, it is also possible to ascertain a connection to a device, present in the space, comprising a display unit, e.g. a smartphone, e-reader, laptop or television, which displays the provided pattern on the display unit.

Figure 7A:
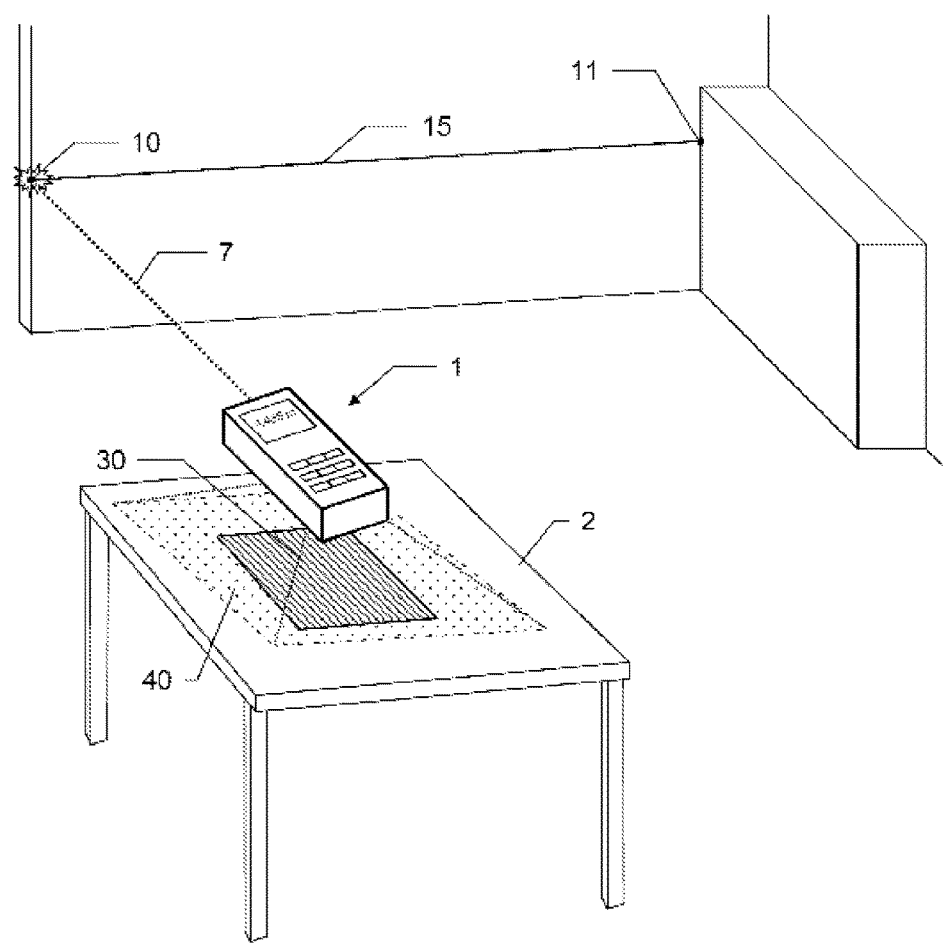
FIGS. 7a-b show a first measuring process and a second measuring process using a portable distance measuring device according to the invention.
Figure 7B:
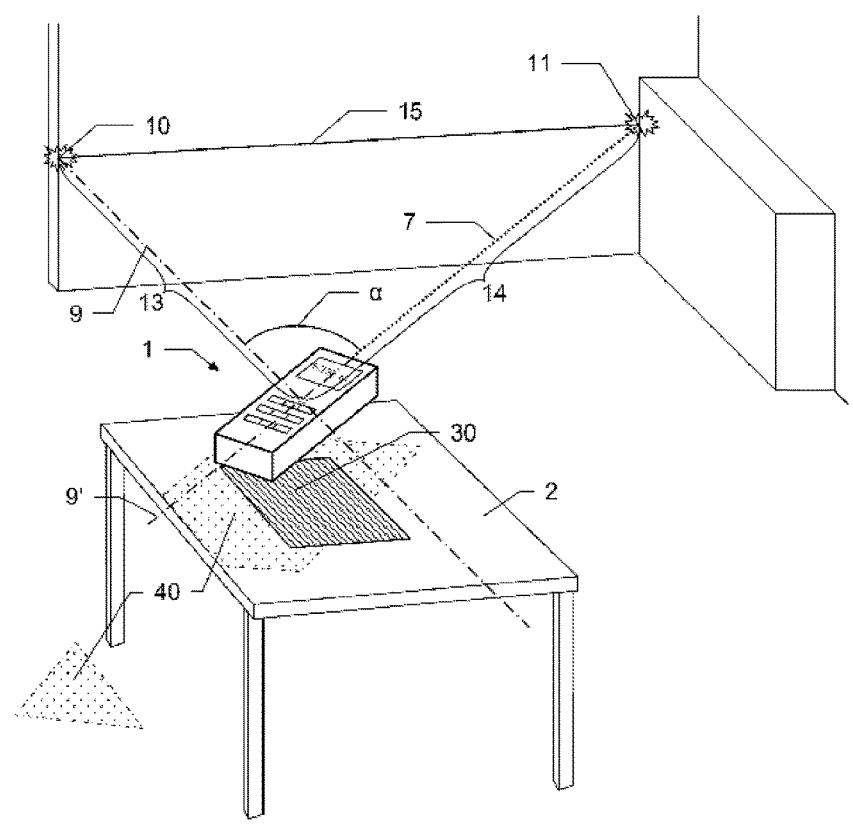

FIGS. 7a and 7b illustrate an exemplary method of how a distance 15 between two spaced apart spatial points may be ascertained with the distance measuring device 1 according to the invention, for example if an obstacle (not depicted here) prevents a direct measurement from point 10 to point 11.

FIG. 7a shows an exemplary embodiment of the portable distance measuring device 1 according to the invention when measuring the distance to a first spatial point 10. In the space, a reference object 30 is placed on a surface which is stationary relative to the measurement point—in this case, the surface 2 of a table. In this example, said reference object is embodied as a flat object with a patterned surface, for example a printed film. It may have means for fixation on the surface 2 so as to ensure that the reference object remains stationary during the measurements. The user targets the first spatial point 10 with the laser beam 7 and triggers a distance measurement.

As a result, recording of a reference image is triggered substantially at the same time, with the reference object 30 having to be situated, at least in part, in the capture zone 40 of the image sensor. The image evaluation component of the distance measuring device 1 evaluates the recorded reference image and identifies the known reference object 30 therein on the basis of the pattern thereof. The pattern optimized for resection allows the image evaluation component to ascertain a relative alignment of the emission direction 9 and a relative pose of the distance measuring device 1 at the instance of the image recording and hence at the instance of the distance measurement. As a result, the relative position of the spatial point 10 in relation to the reference object 30 is detectable, and so the spatial point 10 may be described using coordinates in a local reference coordinate system.

FIG. 7b depicts the portable distance measuring device 1 according to the invention when measuring in the direction of the second spatial point 11. The pose of the reference object 30 is unchanged. The user targets the second spatial point 11 with the laser beam 7, with the reference object 30 being situated, at least in part, in the capture zone 40. A second reference image is recorded substantially at the same time as the second distance measurement and, on the basis of said reference image, a relative pose of the distance measuring device 1 at the time of the second distance measurement is ascertained. As a result, the relative position of the second spatial point 11 in relation to the reference object 30 is also determinable.

Firstly, it is now possible by way of the evaluation unit 25 to ascertain the sought-after distance 15 between the measurement points 10, 11 directly from the ascertained pose change (angle and offset) of the distance measuring device 1 between the first distance measurement and the second distance measurement and from the measured distances 13, 14 to the two spatial points 10, 11. Secondly, the two spatial points 10, 11 may be described with coordinates in the same local reference coordinate system. Theoretically, any number of further points in the space may be described using the same coordinate system for as long as the reference object 30 remains unchanged in its pose.

In one embodiment, the reference object 30 need not necessarily be in the capture zone 40 of the image sensor during each measurement. Once a spatial pose of the distance measuring device 1 is known relative to the reference object 30, it is possible to identify local features in the reference images and transform these by mapping into the reference coordinate system, as already described further above in relation to FIG. 3. These connecting points are then used in subsequent distance measurements for determining the pose of the distance measuring device. This is known as "simultaneous localization and mapping" (SLAM). Since errors of the estimated spatial pose of the distance measuring device 1 estimated by means of SLAM increase exponentially with time, the user may occasionally align the image sensor onto the reference target in order to reduce again the errors for the subsequent measurements. Moreover, this allows the error which arose due to SLAM to be minimized by means of closed-loop optimization.

Ascertained pose data of the device and measurement positions may also, for example, be used immediately to create a spatial model (2D or 3D)—or to orient a plurality of individual images from an overview camera relative to one another or link these with one another.

Figure 8A:
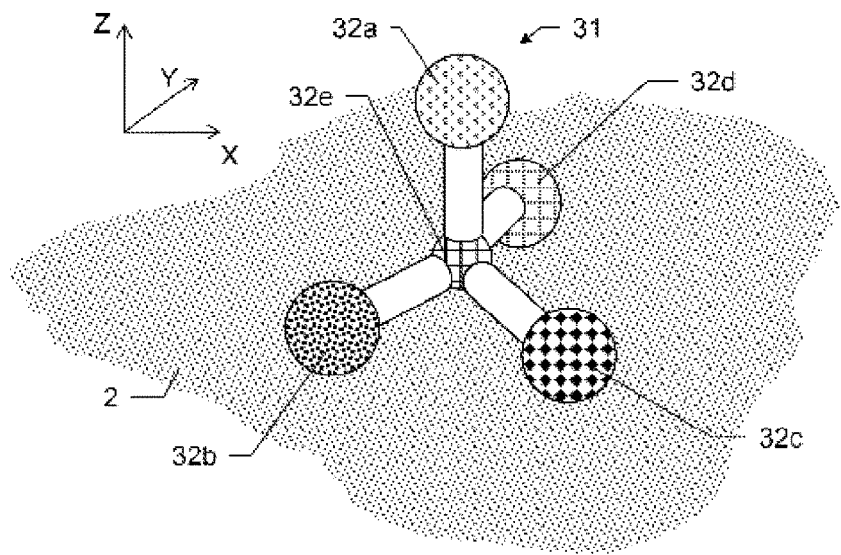
FIG. 8a shows an exemplary three-dimensional reference object for use with a portable distance measuring device according to the invention.
Figure 8B:
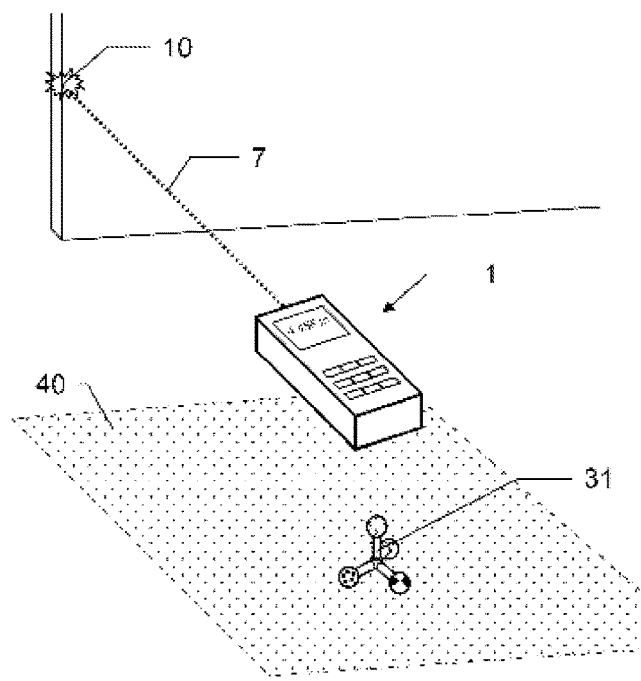

A disadvantage of a two-dimensional reference object 30 is that, in certain configurations, some degrees of freedom may only be determined poorly. This problem may be rectified, in particular, by using a three-dimensional reference object 31. FIGS. 8a and 8b show an exemplary embodiment of a three-dimensional reference object 31 for use with the method according to the invention. In FIG. 8a, the exemplary reference object 31 is depicted in detail; in FIG. 8b, it is depicted within the scope of a measuring process of a distance measuring device 1 according to the invention. In this case, the reference object 31 is configured as a tetrapod, with spherical reference bodies 32a-e being provided at the ends of the four arms and in the center of the tetrapod. Each one of the five reference bodies 32a-e has a pattern which makes it optically distinguishable from the others and prevents rotational symmetries.

The selected arrangement renders it possible for the image sensor of the distance measuring device 1 always to image at least three reference bodies 32a-e when the reference object 31 lies in the capture zone 40. Preferably, the reference object 31 is designed in such a way that it comes to rest without wobbling on a planar surface 2. It is also possible to define a local reference coordinate system (with axes X, Y, Z) by this reference object 31, in which the distance measuring device 1, and hence also a spatial point 10 measured thereby, may be referenced.

As already depicted with reference to FIG. 6, the patterns of the reference object 31 are stored in the memory unit 26. In the case of a three-dimensional reference object 31, the distance measuring device 1 may have a data interface (Bluetooth, USB, etc.) for connection to a 3D printer or another machine in order to produce a reference object 31 by manufacturing methods which build up or ablate materials.

Figure 9A:
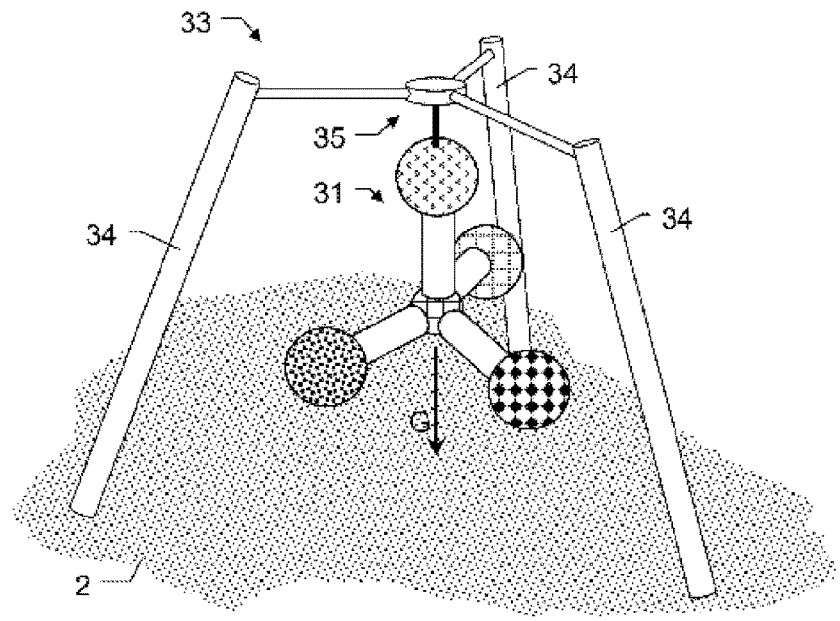
FIGS. 9a-b show two exemplary mounts for freely hanging a three-dimensional reference object.
Figure 9B:
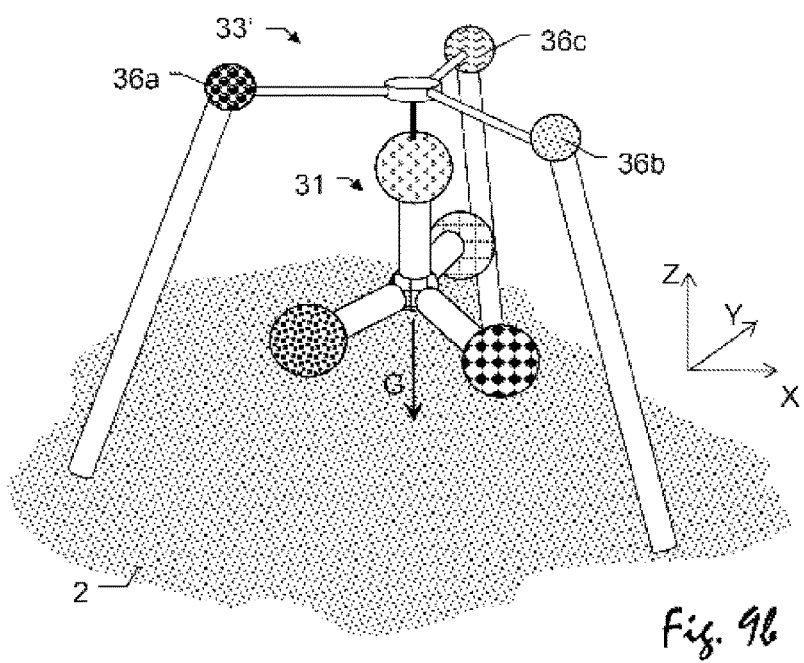

FIGS. 9*a* and 9*b* depict the three-dimensional reference object 31 from FIGS. 8*a* and 8*b* suspended from a mount 33, 33'. The mount 33, 33' is configured in each case with three feet 34, which should be placed onto the surface 2, of a suspension apparatus 35 onto which the reference object 31 is fastened in such a way that it can align freely in the direction of gravitational acceleration G.

Such a suspension of the reference object 31 facilitates the alignment of coordinates in the direction of gravitational acceleration G instead of along a surface 2 of the space, onto which surface the reference object 31 is placed (see FIG. 8*a*). In FIG. 9*b*, the mount 33' has additional reference bodies 36*a-c*, which, in terms of the patterns, once again differ from those of the reference object 31. As a result, it is possible to describe points with coordinates both relative to the surface 2 and relative to the direction of the gravitational acceleration G in a local reference coordinate system (with the axes X, Y, Z and the direction of gravitational acceleration G) defined on the basis of this apparatus.

Alternatively, the reference object 31 may also be configured to actively align along the direction of gravitational acceleration G. To this end, it may have, in particular, a corresponding sensor and a motor.

Optionally, the suspended reference object 31 may additionally be ferromagnetic and hence be configured as a compass needle such that the direction of the Earth's magnetic field may also be derivable from the reference images.

The feet 34 of the mount 33 may optionally be fastenable to the surface 2 by suction pads or other means.

Provided that the distance measuring device itself has suitable inclination or acceleration sensors for ascertaining the direction of the gravitational acceleration G, there may, additionally or alternatively, also be an alignment of the local reference coordinate system to the gravitational acceleration by means of these sensors.

Figure 10:
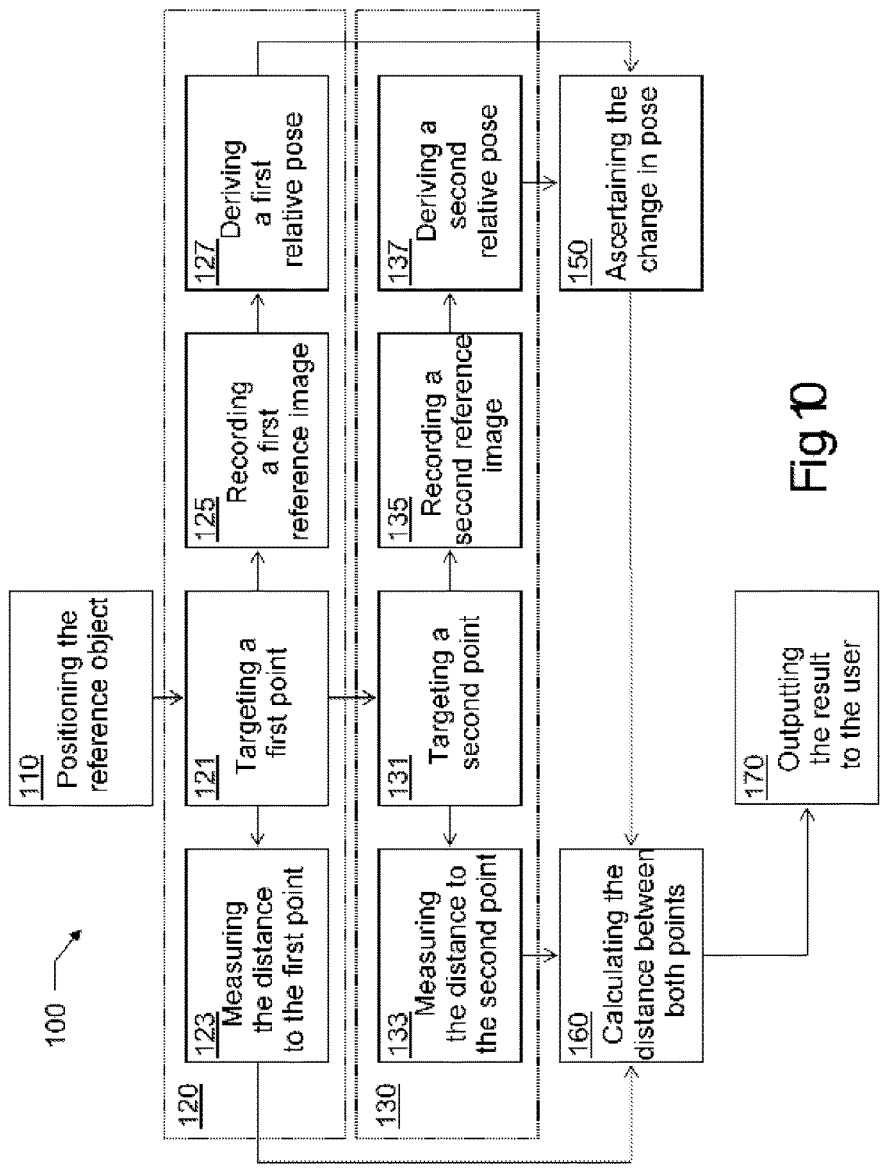
FIG. 10 shows a first exemplary embodiment of a method according to the invention.

FIG. 10 shows a flowchart which illustrates individual steps of a first exemplary embodiment of a measuring method 100 according to the invention.

At the start of the method 100, in a first step 110, the user positions the reference object known to the distance measuring device in such a way in space that it is in each case situated in the capture zone of the image sensor during the subsequent distance measurements.

Thereafter, the user starts the first measuring process 120 by virtue of targeting 121 a first point to be measured by means of the distance measuring device and measuring 123 a distance to this first point by means of the distance measuring device. During this distance measurement, the image sensor of the distance measuring device fully automatically records 125 an image of the reference object. The image evaluation unit identifies the reference object in the image and, on the basis of the patterns of the reference object arranged in a known manner, derives 127 a first relative pose of the distance measuring device.

Subsequently, the user starts the second measuring process 130 by targeting 131 a second point to be measured and triggering a distance measurement 133 to this second point. Once again, the image sensor fully automatically records 135 an image of the reference object and the evaluation unit again derives 137 a second relative pose of the distance measuring device on the basis of the patterns of the reference object in the image.

In the subsequent step 150, the evaluation unit of the distance measuring device determines a difference between the first relative pose and the second relative pose, and thus ascertains an absolute change in pose of the device, in particular a solid angle and an offset between a first emission direction and a second emission direction of the measurement radiation.

A spatial distance between the two points may then be calculated 160 from the distances measured in the two measuring processes 120, 130 and the ascertained change in pose 150. Ultimately, the result may be output to the user on a display unit of the device.

FIG. 11 shows a flowchart which illustrates the individual steps of a second exemplary embodiment of a measuring method 100' according to the invention.

The reference object is initially positioned 110 within the scope of this method 100' as well. Thereafter, the user carries out a first measuring process 120', which differs from the first measuring process of the method depicted in FIG. 10 in that—instead of deriving a first relative pose of the distance measuring device—a position to the first point is determined 129 directly in a reference coordinate system on the basis of the reference image and the measured distance to said point. Subsequently, this position is stored 140.

A second measuring process 130' or—in principle, any number of—further measuring processes may be carried out with a time offset—in principle, of any size—(for example after a brief interval or else on the subsequent day) provided that the reference object is not moved in the meantime. Therefore, the reference object preferably has a fastening means for fastening to a surface (e.g. suction pad, adhesive surface or magnets).

Since, in principle, the second measuring process 130' is identical to the first measuring process 120' (with the difference that a second point is measured and a second reference image is recorded), it is depicted here in a simplified manner and without sub-steps. A position in the local reference coordinate system is also determined for the second point measured in the second measuring process 130'. The distance between the two points is then calculated 160 on the basis of the stored coordinates of the first point and the just ascertained coordinates of the second point. The output 170 of the result is then once again carried out analogously to the method from FIG. 10.

In an exemplary manner, FIGS. 12*a* to 12*e* depict measuring methods which may be carried out with the portable distance measuring device 1 according to the invention and the image-based pose ascertainment functionality thereof according to the invention.

FIG. 12*a* illustrates a method for determining a span, i.e. a distance between two points, from a remote standpoint. To this end, a first measurement point 10 is initially targeted and measured. Thereupon, the distance measuring device 1 is swiveled in order to target a second measurement point 11, the distance 15 of which from the first measurement point 10 should be ascertained. Here, in particular, a mode of continuous measurement ("tracking mode") is possible, in which the distance 15 from the first measurement point 11 is displayed on the display for each targeted point.

FIGS. 12*b* and 12*c* illustrate a method for easily determining a vertical distance of a measurement point from a horizontal plane 17 defined by a first measurement point 10. To this end, a reference height (e.g. a point on a wall) is measured after starting the application. Subsequently, the reference height is transferred to any point. To this end, the distance measuring device 1 is e.g. aligned onto a point on another wall and the measurement is triggered. The display then depicts a relative height of the laser point in relation to the horizontal plane 17 defined by the reference height. By an orientation variation of the distance measuring device 1 in terms of elevation and a new measurement, it is possible, for example, to mark a second measurement point at the same height or at any other desired height. Here, a mode of continuous measurement ("tracking mode") is also possible by virtue of reaching the reference height or any other height set by the user being indicated automatically or by continuously indicating the distance of a current measurement point from this height.

FIGS. 12*d* and 12*e* illustrate a further method that may be carried out with the portable distance measuring device according to the invention. The depicted method allows the determination of an orthogonal distance of a measurement point from a straight line which is defined by two first measurement points 10, 11. To this end, the user initially targets a measurement point 10 and measures the distance thereof and the current alignment of the distance measuring device 1. Subsequently, the user repeats this with a second measurement point 11. As a result, a straight line is defined through both measurement points 10, 11. All measurements are treated as projections onto the horizontal. Now, the user targets a third measurement point; the display indicates the distance of the point from the straight line. The user may now move the laser point until a desired distance is found. In particular, this function may be used to determine a parallel line 16 to the straight line.

Figure 13A:
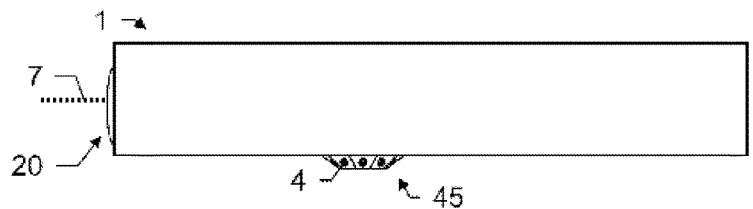
FIGS. 13a-d show two exemplary camera arrangements of a distance measuring device according to the invention.
Figure 13B:
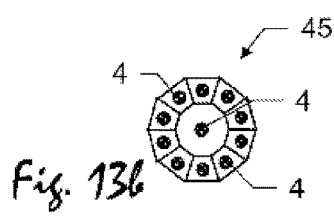
Figure 13C:
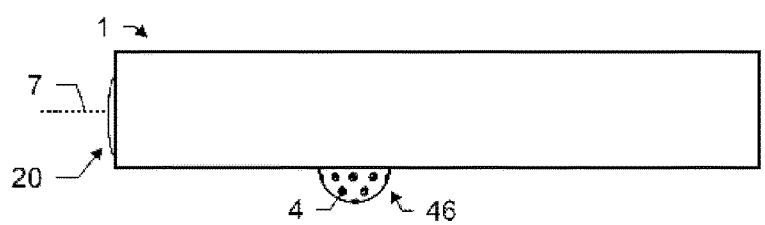
Figure 13D:
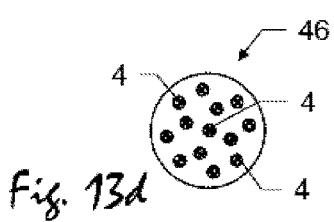

FIGS. 13*a*-*d* depict two alternative camera arrangements 45, 46 in an exemplary manner. FIGS. 13*a* and 13*c* each show a portable distance measuring device 1 in a side view, comprising a laser rangefinder 20 which is configured to emit a laser beam 7 in an emission direction. The design of the devices shown here substantially corresponds to that shown in FIG. 6. FIGS. 13*b* and 13*d* show the respective camera arrangements 45, 46 in a plan view. Using these camera arrangements 45, 46, it is possible to record a multiplicity of individual images simultaneously, with the capture zone being significantly increased in relation to a single image sensor 4, and so a recording angle may be up to 180° or even therebeyond. Optionally, a wide-angle image may be composed from the individual images.

The camera arrangement 45 shown in FIGS. 13*a* and 13*b* comprises a first image sensor 4, which is aligned e.g. orthogonal to, or approximately, toward the emission direction of the measurement beam 7, and a multiplicity of further image sensors 4 which are arranged around the first camera 41 in a circular manner and aligned in different target directions. In a variant not shown here, the further image sensors 4 are arranged in a semicircular manner such that no images directed toward the rear are captured.

The camera arrangement 46 shown in FIGS. 13*c* and 13*d* is configured in the form of a hemisphere, on the surface of which a multiplicity of image sensors 4 are arranged.

Figure 14:
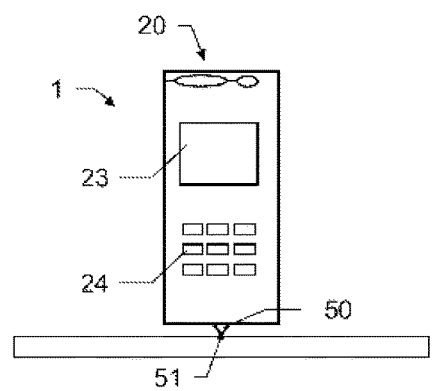
FIG. 14 shows a further exemplary embodiment of a distance measuring device according to the invention, comprising a holding point.

FIG. 14 shows a further embodiment of a portable distance measuring device 1 according to the invention.

According to this embodiment, the distance measuring device 1 additionally comprises a holding point 51, the position of which on the distance measuring device 1 is known and which is destined for being held at a point 50 of a surface of a space. As a result of this, it is possible, for example, to ascertain the distance from this surface point 50 to a spatial point targeted by the laser rangefinder 20. Here, the holding point 51 is depicted as a point; however, alternatively, it can naturally also be formed by a corner of the distance measuring device 1.

The holding point 51 may optionally have a pull-out or fold-out design. It may preferably have a tactile or optical sensor which determines whether or not it is held on a surface such that the device can include the additional distance in calculation (if the holding point 51 is not the basis for the distance calculation in any case). Alternatively, holding may also be indicated by a user by way of the input means 24.

Figure 15:
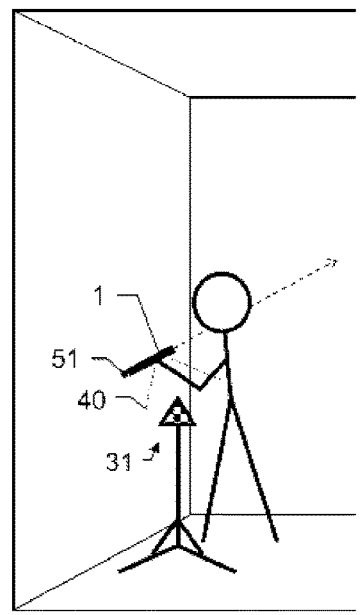
FIG. 15 shows capturing of relative coordinates by means of the distance measuring device from FIG. 14.

FIG. 15 shows the distance measuring device 1 from FIG. 14 when carrying out a first method step of an exemplary embodiment of the method according to the invention. A user holds the portable distance measuring device 1 on a point 50 to be measured on the one wall of the space (with the holding point depicted in FIG. 14). The distance measuring device 1 comprises a camera—not depicted here—which has a capture zone 40 for recording images. A reference object 31 with features which may be ascertained optically and which are arranged in a known pattern is situated in the capture zone 40 of the camera. As soon as the device identifies that it is held on a surface point 50, or as soon as the user signals this to the device, the camera, at the same time or substantially at the same time, records—in particular in a fully automated manner—a reference image of the known reference object 31 situated in the capture zone 40. The patterns of the reference object 31 allow the relative position of the camera, and hence of the distance measuring device 1, to be ascertained in relation to the reference object 31 in six degrees of freedom (6 DOF) by image evaluation and resection. If the reference object 31 remains unchanged in terms of its position, it is possible to carry out a multiplicity of position measurements within the same local coordinate system—both by means of the holding point shown in FIG. 14 and by means of a laser rangefinder (as e.g. shown in FIG. 3). As already described in relation to FIG. 3, the reference object 31 may be referenced in space prior to the start of the measurements, or it is possible to calibrate a plurality of mutually distinguishable targets in a common reference coordinate system.

Figure 16:
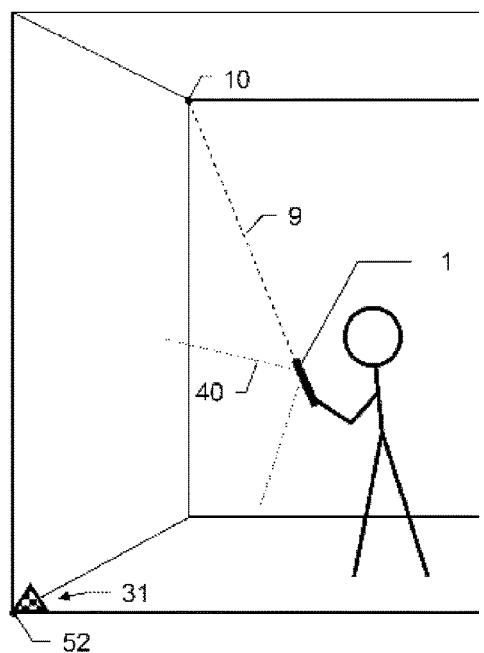
FIG. 16 shows measuring of the distance to a first point and, at the same time, capturing a spatial pose of the distance measuring device in relation to a second point.

FIG. 16 shows a development of the method shown in FIG. 3. Here, the reference object 31 has a placement point at a defined position, said placement point being configured to be placed on a surface point 52. In the shown example, this is a corner of the space.

As already described with reference to FIG. 3, the user targets a point 10 to be measured—in this case a further corner of the space—with the portable distance measuring device 1 in such a way that the emission direction 9 of the measurement beam points at the point 10. The distance measuring device 1 has a camera (not depicted here) which has a capture zone 40 for recording images. The reference object 31 with features which may be ascertained optically and which are arranged in a known pattern is situated in this capture zone 40. While the user triggers the measurement to the point 10, the camera simultaneously, or substantially simultaneously, records a reference image of the known reference object 31 situated in the capture zone 40. The patterns of the reference object 31 allow the relative position of the camera, and hence of the distance measuring device 1, to be ascertained in relation to the reference object 31 in six degrees of freedom (6 DOF) by image evaluation and resection. Moreover, the relative position of the placement point of the reference object, and hence of the surface point 52, is derivable from the patterns such that a spatial relationship between the two corners 10, 52 is ascertainable using only one measurement.

It is understood that these depicted figures only schematically illustrate possible exemplary embodiments. The various approaches may likewise be combined with one another and with methods and devices from the prior art.

What is claimed is:

1. A method for capturing a relative position of at least one first spatial point by means of a portable distance measuring device, the method comprising:
positioning a known three-dimensional reference object in a capture zone of an image sensor of the portable distance measuring device and spaced away from the first spatial point, said known three-dimensional reference object having known features configured to be captured by optical means and are designed for a resection, wherein the features are arranged as a multiplicity of differently formed or patterned surfaces of the three-dimensional reference object;
at least one first measuring process, comprising:
measuring a first distance to the first spatial point, and
recording a first reference image linked in time with measuring the first distance, the reference object being at least partly imaged in the first reference image; and
ascertaining, using image evaluation and resection, the position and orientation of the distance measuring device relative to the reference object comprising:
identifying the reference object;
recalling stored information about known features of the identified reference object; and
identifying positions of known features of the reference object in the first reference image.

2. The method according to claim 1, wherein:
at least one first and one second measuring process and in that ascertaining of the position and orientation of the distance measuring device relative to the reference object comprises ascertaining a pose change of the distance measuring device between the first measuring process and the second measuring process, the second measuring process comprising:
measuring a second distance to the second spatial point, and
recording a second reference image linked in time with measuring the second distance, the reference object being imaged in the second reference image;
and ascertaining of the pose change comprising:
identifying the reference object;
recalling stored information about known features of the identified reference object; and
identifying positions of known features of the reference object in the first reference image and in the second reference image.

3. The method according to claim 2, wherein:
the first reference image and the second reference image are recorded using an image sensor of the distance measuring device, and ascertaining the change in pose contains capturing a first spatial pose and a second spatial pose of the distance measuring device, wherein:
the known features are imaged on an image plane of the image sensor in the first reference image and the second reference image,
capturing of the first spatial pose is carried out on the basis of the positions of the known features of the first reference image on the image plane, and
capturing of the second spatial pose is carried out on the basis of the positions of the known features of the second reference image on the image plane.

4. The method according to claim 1, wherein:
the first measuring process comprises aligning the distance measuring device onto a first spatial point in a first emission direction, and measuring of the first distance to the first spatial point is carried out in the first emission direction.

5. The method according to claim 4, wherein:
a second measuring process comprises aligning the distance measuring device onto a second spatial point, and measuring of a second distance to the second spatial point is carried out in the second emission direction.

6. The method according to claim 1, wherein:
the three-dimensional reference object is substantially cubical, tetrahedral, tetrapodic or pyramidal and/or comprises a multiplicity of substantially spherical reference bodies.

7. The method according to claim 1, wherein:
the three-dimensional reference object is aligned in the direction of gravitational acceleration.

8. The method according to claim 1, wherein:
the known features have patterns configured as QR codes, Aztec codes or ArUco codes.

9. The method according to claim 1, wherein:
the three-dimensional reference object is aligned in the direction of gravitational acceleration by freely hanging the reference object on a mount fastened on a surface of the space by means of an adhesive surface, a suction pad, a magnet and/or a screw thread of the mount.

10. The method according to claim 1, wherein:
fastening the reference object in the space, in particular on a surface of the space means of an adhesive surface, a suction pad, a magnet and/or a screw thread of the reference object.

11. The method according to claim 1, wherein:
positioning the reference object with a known spatial relationship to a spatial point, wherein the reference object has a labeled placement point for placement on this spatial point, and ascertaining the position and orientation of the distance measuring device relative to the spatial point.

12. The method according to claim 1, wherein:
feature data, comprising information about known features of at least one known reference object, are stored in a memory unit of the distance measuring device and provided for identifying the reference object.

13. The method according to claim 12, wherein:
the feature data are provided to a printer or 3D printer, and the reference object is produced by the a printer or 3D printer.

14. A portable distance measuring device for ascertaining relative coordinates of spatial points, the portable distance measuring device comprising:
a distance measuring unit for measuring distances to spatial points along an emission direction in a space,
an evaluation component configured to derive and provide the measured distances,
a pose determination unit for ascertaining a relative spatial pose of the distance measuring device, and
a memory unit for storing feature data and for providing the feature data to the pose determination unit, the feature data comprising information about known features, configured to be captured by optical means, of one or more known three-dimensional reference objects, wherein the features are arranged as a multiplicity of differently formed or patterned surfaces of the three-dimensional reference objects,
wherein the pose determination unit comprises:
at least one image sensor configured to record reference images linked in time with measuring of a distance by the distance measuring unit, and
an image evaluation component configured to identify the one or more known three-dimensional reference object, imaged in the reference images recorded by the at least one image sensor, on the basis of the provided feature data and use image evaluation and resection to ascertain a pose of the distance measuring device on the basis of the distribution of the features in at least one reference image.

15. The distance measuring device according to claim 14, wherein:
the image evaluation component is configured to ascertain a change in pose of the distance measuring device on the basis of the distribution of the features in at least two reference images; and
the evaluation component is configured to link the ascertained change in pose with at least two measured distances;
wherein the evaluation component is configured to:
derive and provide the ascertained change in pose,
calculate and provide a distance between two measured spatial points, and/or
calculate and provide positions in a three-dimensional local coordinate system.

16. The distance measuring device according to claim 14, wherein:
the image sensor and the distance measuring unit are arranged on the distance measuring device in such a way that the emission direction and a recording direction of the image sensor are substantially parallel.

17. The distance measuring device according to claim 14, wherein:
a display unit for displaying measured and calculated distances and/or coordinates of spatial points, and
input means for selecting functions of the distance measuring device,
wherein the display unit and the input means are arranged on a first side of the distance measuring device and the image sensor is arranged on a second side of the distance measuring device lying opposite to the first side,
wherein the distance measuring device additionally comprises an overview camera for recording images in the direction of the emission direction and the display unit is additionally configured to display images recorded by means of the overview camera.

18. The distance measuring device according to claim 14, wherein:
the distance measuring device comprises a memory unit for storing feature data and for providing the feature data to the pose determination unit, the feature data comprising information about known features, which may be captured by optical means, of one or more known reference objects, and
the image evaluation component is configured to identify an imaged known reference object in the at least one reference image on the basis of the provided feature data and is configured to ascertain a pose of the distance measuring device on the basis of the distribution of the features in the at least one reference image.

19. The distance measuring device according to claim 14, wherein
the reference object has known features which may be captured by the image sensor, said features being arranged in a pattern optimized for a resection, and
the known features of the reference object are provided in a memory unit of the distance measuring device.

20. The distance measuring device according to claim 14, wherein the distance measuring device and the reference object are configured in such a way that they may be assembled to form a unit suitable for transport and storage.

21. The distance measuring device according to claim 14, wherein the distance measuring device has a receptacle for the reference object.

22. The distance measuring device according to claim 14, wherein the reference object is configured as a sleeve of the distance measuring device.

23. The distance measuring device according to claim 14, wherein the image sensor and the distance measuring unit are arranged on the distance measuring device in such a way that the emission direction of the distance measuring unit lies outside of a capture zone of the image sensor arranged in such a way that the emission direction and a recording direction of the image sensor are substantially orthogonal.

24. The distance measuring device according to claim 14, wherein the image sensor and the distance measuring unit are arranged on the distance measuring device in such a way that the emission direction of the distance measuring unit lies within a capture zone of the image sensor and provision is made of deflection means which comprise at least one mirror and which are configured to deflect a recording direction of the image sensor in such a way that the emission direction and a recording direction of the image sensor are substantially orthogonal.

25. The distance measuring device according to claim 14, wherein the emission direction of the distance measuring unit and a recording direction of the image sensor are arranged at an angle of 75° to 100° in relation to one another.

26. A portable distance measuring device comprising:
a distance measuring unit for measuring distances to spatial points along an emission direction in a space,
an evaluation component configured to derive and provide the measured distances,
a holding point for holding the distance measuring device on a surface point on a surface of the space, a pose determination unit for ascertaining a spatial pose of the distance measuring device, and
a memory unit for storing feature data and for providing the feature data to the pose determination unit, the feature data comprising information about known features, configured to be captured by optical means, of one or more known three-dimensional reference objects, wherein the features are arranged as a multiplicity of differently formed or patterned surfaces of the three-dimensional reference objects,
wherein the pose determination unit comprises:
at least one image sensor configured to record at least one reference image linked in time with holding the distance measuring device at a surface point, and
an image evaluation component configured to identify features in the at least one reference image and use image evaluation and resection to ascertain a relative position of the surface point on the basis of the distribution of the features in at least one reference image.

27. One or more non-transitory computer-readable media storing one or more programs that are configured, when executed on a distance measuring device as recited in claim 26, to cause one or more processors to execute the following steps:
measuring a first distance to a first spatial point,
recording a first reference image linked in time with measuring the first distance, a known reference object being at least partly imaged in the first reference image; and ascertaining, using image evaluation and resection, the position and orientation of the distance measuring device relative to the reference object comprising:
identifying the reference object;
recalling stored information about known features of the identified reference object; and
identifying positions of known features of the reference object in the first reference image.

* * * * *